United States Patent
Cheng et al.

(10) Patent No.: US 7,319,122 B2
(45) Date of Patent: Jan. 15, 2008

(54) POLYPROPYLENE RESIN SUITABLE FOR FIBERS AND NONWOVENS

(75) Inventors: Chia Yung Cheng, Seabrook, TX (US); Galen Charles Richeson, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 441 days.

(21) Appl. No.: 11/052,573

(22) Filed: Feb. 7, 2005

(65) Prior Publication Data

US 2005/0182198 A1    Aug. 18, 2005

Related U.S. Application Data

(60) Provisional application No. 60/543,964, filed on Feb. 12, 2004.

(51) Int. Cl.
*C08L 23/00*    (2006.01)
*C08L 23/04*    (2006.01)

(52) U.S. Cl. ........................ 525/191; 525/240

(58) Field of Classification Search ............... 525/191, 525/240
See application file for complete search history.

(56) References Cited

U.S. PATENT DOCUMENTS

| | | | |
|---|---|---|---|
| 4,340,563 A | 7/1982 | Appel et al. | |
| 5,171,628 A | 12/1992 | Arvedson et al. | |
| 5,460,884 A | 10/1995 | Kobylivker et al. | |
| 5,571,619 A | 11/1996 | McAlpin et al. | |
| 5,629,080 A | 5/1997 | Gupta et al. | |
| 5,654,088 A | 8/1997 | Gupta et al. | |
| 5,733,646 A | 3/1998 | Gupta et al. | |
| 5,744,548 A * | 4/1998 | Nohr et al. | 525/106 |
| 5,763,532 A | 6/1998 | Harrington et al. | |
| 5,882,562 A | 3/1999 | Kozulla | |
| 6,235,664 B1 | 5/2001 | Georgellis et al. | |
| 6,248,833 B1 | 6/2001 | Colucci et al. | |
| 6,268,302 B1 | 7/2001 | Ofosu et al. | |
| 6,342,565 B1 | 1/2002 | Cheng et al. | |
| 6,407,171 B1 | 6/2002 | Agarwal et al. | |
| 6,454,989 B1 | 9/2002 | Neely et al. | |
| 6,476,135 B1 | 11/2002 | Bugada et al. | |
| 2002/0045712 A1* | 4/2002 | Hashimoto et al. | 525/240 |
| 2003/0088022 A1 | 5/2003 | Lin et al. | |

FOREIGN PATENT DOCUMENTS

| | | |
|---|---|---|
| EP | 0 646 624 A | 4/1995 |
| WO | 00/70134 | 11/2000 |
| WO | 01/64980 | 9/2001 |
| WO | 02/16681 | 2/2002 |

* cited by examiner

*Primary Examiner*—Nathan M. Nutter
(74) *Attorney, Agent, or Firm*—C. Paige Schmidt; Kevin M. Faulkner

(57) ABSTRACT

A blended polypropylene composition, fiber, and nonwoven articles made therefrom are provided. In one aspect, the blended polypropylene composition comprises a first polymer component having a molecular weight distribution of from 2.5 to 8, and a second polymer component having a molecular weight distribution of from 1.8 to 3. The first polymer component has a melt flow rate of greater than 30 g/10 min. and the second polymer component has a melt flow rate of less than 40 g/10 min., and the blended polypropylene composition has a melt flow rate of greater than 5 g/10 min.

16 Claims, No Drawings

POLYPROPYLENE RESIN SUITABLE FOR FIBERS AND NONWOVENS

This application claims the benefit of U.S. patent application Ser. No. 60/543,964 filed Feb. 12, 2004.

BACKGROUND OF THE INVENTION

1. Field of the Invention

Embodiments of the present invention generally relate to a blended polypropylene resin. More particularly, embodiments of the present invention relate to a blended polypropylene resin for making spunbond fibers and laminates therefrom.

2. Description of the Related Art

Polyolefin resins have been used to form fibers useful for making nonwoven fabrics and nonwoven webs. Nonwoven fabrics and webs are useful for a wide variety of consumer products and commercial applications such as diapers, feminine hygiene products, towels, recreational fabrics, and protective fabrics. Such products that are intended to be worn by a consumer are more desirable when the fiber of the product is soft to the touch and conforms to the body of the wearer. For example, woven or nonwoven fabrics made from fibers having a higher elongation are more stretchable and thus, have a better body conformance. Therefore, much attention has been directed to improving the elongation of polyolefin fibers, and improving the extensibility of nonwoven fabric from such fibers.

Improving extensibility of nonwoven fabrics, however, is generally accomplished at the expense of the processability and spin rates of the fibers. There is a need, therefore, to provide a polyolefin fiber having a greater elongation than those conventionally produced and which is also capable of being processed at high spinning speeds.

SUMMARY OF THE INVENTION

A blended polypropylene composition useful for fibers and nonwoven articles made therefrom is provided. In one aspect, the blended polypropylene composition comprises a first polymer component having a molecular weight distribution of from 2.5 to 8, and a second polymer component having a molecular weight distribution of from 1.8 to 3. The first polymer component has a melt flow rate of greater than 20 g/10 min. and the second polymer component has a melt flow rate less than 40 g/10 min. The blended polypropylene composition has a melt flow rate of greater than 5 g/10 min.

In another aspect, the blended polypropylene composition comprises a high molecular weight component having a melt flow rate of less than 40 g/10 min and a molecular weight distribution of from 2.5 to 8; and a low molecular weight component having a melt flow rate of greater than 20 g/10 min and a molecular weight distribution of from 1.8 to 3. The blended polypropylene composition has a melt flow rate of greater than 5 g/10 min.

In yet another aspect, the blended polypropylene composition comprises a high molecular weight component having a melt flow rate of less than 40 g/10 min and a molecular weight distribution of from 1.8 to 3; and a low molecular weight component having a melt flow rate of greater than 20 g/10 min and a molecular weight distribution of from 2.5 to 8. The blended polypropylene composition has a melt flow rate of greater than 5 g/10 min.

In still another aspect, the blended polypropylene composition comprises at least one high molecular weight polymer component having a weight averaged molecular weight of greater than 140,000, a melt flow rate of less than 40 g/10 min measured according to ASTM D-1238 condition 230/2.16, and a molecular weight distribution of from 2.5 to 8; and at least one low molecular weight polymer component having a weight averaged molecular weight of less than 200,000, a melt flow rate of greater than 20 g/10 min measured according to ASTM D-1238 condition 230/2.16, and a molecular weight distribution of from 1.8 to 3. The blended polypropylene composition has a melt flow rate of greater than 5 g/10 min measured according to ASTM D-1238, condition 230/2.16.

In a further aspect, the blended polypropylene composition comprises at least one high molecular weight component having a weight averaged molecular weight of greater than 140,000, a melt flow rate of less than 40 g/10 min and a molecular weight distribution of from 1.8 to 3; and at least one low molecular weight component having a weight averaged molecular weight of less than 200,000, a melt flow rate of greater than 20 g/10 min and a molecular weight distribution of from 2.5 to 8. The blended polypropylene composition has a melt flow rate of greater than 5 g/10 min according to ASTM D-1238, condition 230/2.16.

In an additional aspect, the blended polypropylene composition comprises a first polymer component consisting essentially of a first polypropylene having a weight averaged molecular weight of greater than 140,000, a melt flow rate of 40 g/10 min or less measured according to ASTM D-1238, condition 230/2.16; a second polymer component consisting essentially of a second polypropylene having a weight averaged molecular weight of less than 200,000, a melt flow rate of 20 g/10 min or more measured according to ASTM D-1238, condition 230/2.16. The molecular weight distribution of the first polypropylene is from 1.8 to 3 and the molecular weight distribution of the second polypropylene is from 2.5 to 8 or, alternatively, the molecular weight distribution of the first polypropylene is from 2.5 to 8 and the molecular weight distribution of the second polypropylene is from 1.8 to 3.

In still yet another aspect, the blended polypropylene composition comprises from 10 to 30 percent by weight of a first polymer component having a melt flow rate of about 2 g/10 min measured according to ASTM D-1238, condition 230/2.16, and from 90 to 70 percent by weight of a second polymer component having a melt flow rate of about 36 g/10 min or more measured according to ASTM D-1238, condition 230/2.16, wherein the first polymer component and the second polymer component each have a molecular weight distribution of from 2.5 to 8 or a molecular weight distribution of from 1.8 to 3. The blended polypropylene composition has a melt flow rate of greater than 20 g/10 min measured according to ASTM D-1238, condition 230/2.16.

DETAILED DESCRIPTION

A polymer resin having the capability to make higher elongation fibers at spin rates greater than 3000 m/min is provided. The polymer resin is preferably a blend of at least two polymer components in which at least one polymer component has a broad molecular weight distribution (MWD), and at least one polymer component has a narrow MWD. For example, the polymer resin may be a blend of a low molecular weight polymer component that has a broad MWD and a high molecular weight polymer component that has a narrow MWD. The polymer resin may also be a blend of a low molecular weight polymer component that has a narrow MWD and a high molecular weight polymer component that has a broad MWD.

Molecular weight distribution (MWD) is a measure of the range of molecular weights within a given polymer sample. It is well known that the breadth of the MWD can be characterized by the ratios of various molecular weight averages, such as the ratio of the weight average molecular weight (Mw) to the number average molecular weight (Mn), or the ratio of the Z-average molecular weight (Mz) to the weight average molecular weight (Mw). Unless otherwise specified, "MWD" as used herein refers to the ratio of Mw to Mn.

In one aspect, the polymer resin has a MWD of 2.5 of more. In another aspect, the polymer resin has a MWD of 3 of more. In yet another aspect, the polymer resin has a MWD of 4 of more. In still another aspect, the polymer resin has a MWD of 5 of more. In still yet another aspect, the polymer resin has a MWD of from 2.5 to 6, or of from 3 to 5, or of from 2.5 to 5.

The term "polymer" as used herein includes, but is not limited to, homopolymers, copolymers, terpolymers, etc. and alloys and blends thereof. The term "polymer" as used herein also includes impact, block, graft, random and alternating copolymers. The term "polymer" shall further include all possible geometrical configurations unless otherwise specifically stated. Such configurations may include isotactic, syndiotactic and random symmetries.

The term "blend" as used herein refers a mixture of two or more polymers. The term "alloy" as used herein refers to a sub-class of blends in which the components are immiscible but have been compatibilized. "Miscibility" and "immiscibility" are defined as blends having negative and positive values, respectively, for the free energy of mixing. Further, "compatibilization" is defined as the process of modifying the interfacial properties of an immiscible polymer blend in order to make an alloy.

Preferably, each polymer component includes polypropylene. "Polypropylene" as used herein includes homopolymers, copolymers of propylene or mixtures thereof. Products which include one or more propylene monomers polymerized with one or more additional monomers are commonly known as random copolymers (RCP) or impact copolymers (ICP). Impact copolymers are also known in the art as heterophasic copolymers.

In one embodiment, each polymer component further includes one or more olefins selected from ethylene or linear or branched $C_4$ to $C_{20}$ alpha-olefins, preferably ethylene or $C_4$ to $C_8$ alpha-olefins, more preferably ethylene, 1-butene, 1-hexene, 4-methyl-1-pentene, 3-methyl-1-pentene, 3,5,5-trimethyl-1-hexene, and 1-octene, even more preferably propylene or 1-butene, and optionally, minor amounts of non-conjugated diolefins, preferably $C_6$-$C_{20}$ diolefins. The alpha-olefin may contain cyclic structures that are fully saturated such that the alpha-olefin monomer does not contain a cyclic moiety with any olefinic unsaturation or any aromatic structures. Preferred alpha-olefins are mono-olefins.

In one embodiment, each polymer component preferably contains propylene as a main monomer and one or more alpha-olefins other than propylene. The content of the propylene is generally 88 mole percent or more, more preferably 99 mole percent or more. The content of the one or more alpha-olefins (e.g. ethylene) other than propylene is generally 12 mole percent or less, more preferably 1 mole percent or less.

In one embodiment, at least one polymer component is predominately crystalline, meaning it has a melting point greater than 110° C., preferably greater than 115° C., and most preferably greater than 130° C. The term "crystalline" as used herein refers to those polymers having a heat of fusion greater than 60 J/g, preferably at least 70 J/g, or more preferably at least 80 J/g, as determined by Differential Scanning Calorimetry (DSC) at a heating rate of 10° C./minute.

Crystallization temperature ($T_c$) and melting temperature ($T_m$) can be measured as follows. For example, about 6 to 10 mg of a sheet of the polymer or plasticized polymer is pressed at approximately 150° C. to 200° C., and is removed with a punch die. The sample is placed in a Differential Scanning Calorimeter (Perkin Elmer 7 Series Thermal Analysis System) and heated to 200° C. and held for 10 minutes. The sample is cooled at 10° C./min to attain a final temperature of 25° C. The thermal output is recorded and the inflection point in the thermal output data, indicating a change in the heat capacity is determined by electronically differentiating the thermal output data. The maximum in the differential thermal output data corresponds to the crystallization temperature of the sample. The sample is held at 25° C. for 10 minutes and heated at 10° C./min to 200° C. The thermal input is recorded and the inflection point in the thermal input data, indicating a change in the heat capacity is determined by electronically differentiating the thermal input data. The maximum in the differential thermal input data corresponds to the melting temperature of the sample.

In another embodiment, at least one polymer component is a substantially isotactic polypropylene homopolymer or propylene copolymer containing equal to or less than 10 weight percent of other monomer. In yet another embodiment, at least one polymer component is in the form of a graft or block copolymer. In still yet another embodiment, at least one polymer component is a combination of homopolypropylene, and/or random and/or block copolymers.

When the polymer component is a random copolymer, the percentage of the copolymerized alpha-olefin(s) in the copolymer is, up to 9% by weight, preferably from 1% to 8% by weight, most preferably from 2% to 6% by weight. The preferred alpha-olefins contain 2 or from 4 to 12 carbon atoms. The copolymer may include, but is not limited to, one, two, or more alpha-olefins copolymerized with propylene. Exemplary alpha-olefins include, but are not limited to, ethylene, butene-1, pentene-1,2-methylpentene-1,3-methylbutene-1, hexene-1,3-methylpentene-1,4-methylpentene-1, 3,3-dimethylbutene-1, heptene-1, hexene-1, methylhexene-1, dimethylpentene-1 trimethylbutene-1, ethylpentene-1, octene-1, methylpentene-1, dimethylhexene-1, trimethylpentene-1, ethylhexene-1, methylethylpentene-1, diethylbutene-1, propylpentane-1, decene-1, methylnonene-1, nonene-1, dimethyloctene-1, trimethylheptene-1, ethyloctene-1, methylethylbutene-1, diethylhexene-1, dodecene-1 and hexadodecene-1, for example.

Any known method for polymerization may be used to prepare the polymer components. For example, a propylene homopolymer may be obtained by homopolymerization of propylene in a single stage or multiple stage reactor. Copolymers may be obtained by copolymerizing propylene and one or more alpha-olefins having 2 or from 4 to 20 carbon atoms, preferably ethylene, in a single stage or multiple stage reactor. Polymerization methods include high pressure, slurry, gas, bulk, or solution phase, or any combination thereof. Any catalyst or catalyst system may be also used, such as Ziegler-Natta catalysts and metallocene catalysts, for example. Polymerization may be carried out by a continuous or batch process and may include use of chain transfer agents, scavengers, or other such additives as deemed applicable.

The polymer component having a low molecular weight or "the low molecular weight polymer component" typically has a melt flow rate (MFR) of about 20 g/10 min or more at 230° C. as measured by ASTM D-1238, condition 230/2.16. Preferably, the low molecular weight polymer component has a MFR of 30 g/10 min or more, or 35 g/10 min or more, or 40 g/10 min or more, or 50 g/10 min or more, or 100 g/10 min or more, or 200 g/10 min or more, or 300 g/10 min or more, or 400 g/10 min or more. More preferably, the low molecular weight polymer component has a MFR of between 30 g/10 min and 400 g/10 min, or between 40 g/10 min and 200 g/10 min, or between 40 g/10 min and 100 g/10 min, or between 40 g/10 min and 60 g/10 min. Further, the low molecular weight polymer component has a molecular weight of less than 200,000 weight averaged molecular weight based on GPC analyses, such as less than 180,000, less than 170,000, or less than 165,000. Preferably, the low molecular weight polymer component has a molecular weight of about 160,000, such as of from 156,000 to 164,000.

The polymer component having a high molecular weight or "the high molecular weight polymer component" typically has a melt flow rate (MFR) of about 40 g/10 min or less. More preferably, the high molecular weight polymer component has a MFR of 35 g/10 min or less, or 30 g/10 min or less, or 25 g/10 min or less, or 20 g/10 min or less, or 15 g/10 min or less, or 12 g/10 min or less, or 10 g/10 min or less, or 5 g/10 min or less. In one aspect, the MFR may be as low as 2 or 0.1. In another aspect, the high molecular weight polymer component has a MFR of between 0.1 g/10 min and 30 g/10 min, or between 2 g/10 min and 30 g/10 min, or between 5 g/10 min and 30 g/10 min, or between 5 g/10 min and 10 g/10 min, or between 1 g/10 min and 5 g/10 min, or between 0.1 g/10 min and 5 g/10 min. The melt flow rate (MFR) is a measure of the viscosity of a polymer or polymer blend. The MFR is expressed as the weight of material which flows from a capillary of known dimensions under a load of 2.16 kg for 10 minutes and is measured in grams/10 minutes at 230° C. according to, for example, the ASTM D-1238 test, condition 230/2.16. Further, the high molecular weight polymer component has a molecular weight of greater than 140,000 weight averaged molecular weight based on GPC analyses, such as greater than 160,000 or greater than 180,000 or greater than 200,000.

The molecular weight and molecular weight distribution of polymer components can be tailored to the desired level by a controlled rheology process. Any suitable controlled rheology process may be used. For example, a typical controlled rheology is achieved by a free radical depolymerization process carried out in an extruder used to convert the polymer granules to pellets. Peroxides, are preferably added as a thermally activated initiator to trigger the depolymerization reaction.

Blended Ploymer Resin

The polymer components are blended in ratios such that the blended polymer resin has a MFR of 5 g/10 min or more. Preferably, the blended polymer resin has a MFR of 10 g/10 min or more. More preferably, the blended polymer resin has a MFR of 20 g/10 min or more. Even more preferable, the polymer resin has a MFR of 25 g/10 min or more. In one aspect, the blended polymer resin has a MFR of from about 20 g/10 min to about 60 g/10 min. In another aspect, the blended polymer resin has a MFR of from about 20 g/10 min to about 50 g/10 min. In yet another aspect, the blended polymer resin has a MFR of from about 20 g/10 min to about 40 g/10 min. In still yet another aspect, the blended polymer resin has a MFR of from about 25 g/10 min to about 35 g/10 min. In still yet another aspect, the blended polymer resin has a MFR of from about 20 g/10 min to about 30 g/10 min.

In one aspect, the blended polymer resin contains from about 10 percent by weight of the high molecular weight polymer component to about 40 percent by weight of the high molecular weight polymer component. In another aspect, the blended polymer resin contains from about 10 percent by weight of the high molecular weight polymer component to about 35 percent by weight of the high molecular weight polymer component. In another aspect, the blended polymer resin contains from about 10 percent by weight of the high molecular weight polymer component to about 30 percent by weight of the high molecular weight polymer component. In another aspect, the blended polymer resin contains from about 10 percent by weight of the high molecular weight polymer component to about 25 percent by weight of the high molecular weight polymer component. In another aspect, the blended polymer resin contains from about 10 percent by weight of the high molecular weight polymer component to about 20 percent by weight of the high molecular weight polymer component.

Accordingly, the blended polymer resin contains from about 90 percent by weight of the low molecular weight polymer component to about 70 percent by weight of the low molecular weight polymer component. Preferably, the blended polymer resin contains from about 85 percent by weight of the low molecular weight polymer component to about 75 percent by weight of the low molecular weight polymer component.

The polymer resin may be blended by any post reactor method that guarantees an intimate mixture of the components. Blending and homogenation of polymers are well known in the art and include single and twin screw mixing extruders, static mixers for mixing molten polymer streams of low viscosity, impingement mixers, as well as other machines and processes, designed to disperse the high molecular weight polymer component and the low molecular weight polymer component in intimate contact. For example, the polymer components and other minor components can be blended by melt blend or dry blend in continuous or batch process. These processes are well known in the art and include single and twin screw compounding extruders, as well as other machines and processes designed to melt and homogenize the polymer components intimately. The melt blending or compounding extruders usually are equipped with a pelletizing die to convert the homogenized polymer into pellet form. The homogenized pellets can then be fed to the extruder of a fiber or nonwoven process equipment to produce fiber or fabrics.

The polymer resin may also be produced by any reactor blend method currently known in the art. A reactor blend is a highly dispersed and mechanically inseparable blend of the polymers produced in situ as the result of sequential polymerization of one or more monomers with the formation of one polymer in the presence of another. The polymers may be produced in any of the polymerization methods described above. The reactor blends may be produced in a single reactor or in two or more reactors arranged in series.

The polymer resin may further be produced by combining reactor blending with post reactor blending.

Fiber Products

The blended polymer resin may be used to produce fiber products. Exemplary fiber products include, but are not limited to, continuous filament for woven fabrics, nonwovens, carpet, diapers, swimwear, child training pants, adult incontinence garments, feminine care products, medical garments, bed pads, surgical drapes, cloth linings, scrubbing pads, automotive interior parts, garments, tapes, face masks and respirators, air filters, vacuum bags, oil and chemical spill sorbents, thermal insulation, first aid dressings, medical wraps, fiberfill, outerwear, bed quilt stuffing, furniture padding, filter media, scrubbing pads, wipe materials, and combinations thereof.

As used herein, "nonwoven" refers to a textile material that has been produced by methods other than weaving. In nonwoven fabrics, the fibers are processed directly into a planar sheet-like fabric structure by passing the intermediate one-dimensional yarn state, and then are either bonded chemically, thermally, or interlocked mechanically (or both) to achieve a cohesive fabric.

Spunbound Process

The fiber products can be formed by any method, including melt spinning, dry spinning, wet spinning, thermal setting, thermal relaxation, twisting, interlacing, bundling, crimping, meltblowing, spunbonding, air laying, bonded carded web processes and cutting, for example. Preferably, the fibers products, such as nonwovens for example, are produced by a spunbond process. In a typical spunbond process, a hopper equipped with or without a blending device may be used. The hopper supplies polymer to a heated extruder to melt and homogenize the polymers. The extruder supplies melted polymer to a spinnerette where the polymer is fiberized as passed through fine openings arranged in one or more rows in the spinnerette, forming a curtain of filaments. The filaments are usually quenched with air at a low temperature, drawn, usually pneumatically, and deposited on a moving mat, belt or "forming wire" to form the nonwoven fabric. See, for example, in U.S. Pat. Nos. 4,340,563; 3,692,618; 3,802,817; 3,338,992' 3,341, 394; 3,502,763; and U.S. Pat. No. 3,542,615.

The fibers produced in the spunbond process are usually in the range of from about 10 to about 50 microns in diameter, depending on process conditions and the desired end use for the fabrics to be produced from such fibers. For example, increasing the polymer molecular weight or decreasing the processing temperature results in larger diameter fibers. Changes in the quench air temperature and pneumatic draw pressure also has an affect on fiber diameter.

Meltblown Process

The term "meltblown fibers," as used herein, refers to fibers formed by extruding a molten thermoplastic material through a plurality of fine, usually circular, die capillaries as molten threads or filaments into a high velocity gas (e.g. air) stream which attenuates the filaments of molten thermoplastic material to reduce their diameter, which may be to microfiber diameter. The fibers are carried by the high velocity gas stream to a collecting surface to form a web of randomly disbursed meltblown fibers on a moving conveyor screen. The microfiber web may then be thermally bonded to maximize its strength and surface stability or left unbonded for maximum capacity and filtration effectiveness. Such a process is disclosed, for example, in U.S. Pat. Nos. 3,849, 241 and 6,268,203. Meltblown fibers are microfibers which are generally smaller than 10 microns in diameter. The term meltblowing used herein is meant to encompass the melt-spray process.

Laminate Process

The polymer resin is also useful for making multilayer laminates. As used herein, a "multilayer laminate" refers to a layered structure in which some of the layers are spunbond fabric and some are meltblown fabric. For example, a common multilayer laminate is a spunbond/meltblown/spunbond (SMS) laminate. Other laminate configurations are described in, for example, U.S. Pat. Nos. 4,041,203; 5,169,706; 5,145,727; 5,178,931 and 5,188,885. The spunbond fabrics made from this invention (before or after additional downstream treatment of the fabric) may be laminated with other substrate such as film or other types of nonwoven fabrics.

Melt Additives

Certain additives may be used to change the physical and/or chemical properties of the polymer resin and thus, the fiber products. Such properties include strength, repellency, absorbency, fire retardancy, antistatic, UV stability, and gamma radiation stability, for example. Additives may include, but are not limited to, stabilizers, antioxidants, fillers, colorants, nucleating agents, dispersing agents, mold release agents, slip agents, fire retardants, plasticizers, pigments, vulcanizing or curative agents, vulcanizing or curative accelerators, cure retarders, processing aids, tackifying resins, and the like. Other additives may include fillers and/or reinforcing materials, such as carbon black, clay, talc, calcium carbonate, mica, silica, silicate, combinations thereof, and the like. This list described herein is not intended to be inclusive of all types of additives which may be employed. Upon reading this disclosure, those of skill in the art will appreciate other additives may be used to enhance properties of the composition.

End Uses

The nonwoven products described above may be used in many articles such as hygiene products including, but not limited to, diapers, feminine care products, and adult incontinent products, just to name a few. The nonwoven products may also be used in medical products such as sterile wrap, isolation gowns, operating room gowns, surgical gowns, and other disposable items. Some other specific nonwoven articles include, but are not limited to, surgical drapes, feminine hygiene articles, incontinence wear, training pants, swimwear, outerwear, bed quilt stuffing, furniture padding, filter media, scrubbing pads, cloth linings, automotive interior parts, face masks and respirators, vacuum bags, oil and chemical spill absorbents, thermal insulation, first aid dressings, medical wraps, wipe materials, and other products. Some specific products include, but are not limited to, child training pants, bed pads, tapes, air filters, and fiberfill.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated. All molecular weights are weight average molecular weight unless otherwise noted. Molecular weights including weight average molecular weight ($M_w$), number average molecular weight ($M_n$), and z-average molecular weight ($M_z$) were measured by Gel Permeation Chromatography (GPC), also known as size exclusion chromatography (SEC). In the following examples, the GPC instrument used was a Waters chromatograph equipped with ultrastyro gel columns operated at 145° C. The elution solvent used was trichlorobenzene. The columns were calibrated using sixteen polystyrene standards of precisely known molecular weights. A correlation of polystyrene retention volume obtained from the standards, to the retention volume of the polymer tested yielded the polymer molecular weight.

Examples 1-18

In each of the examples, a polypropylene component, labeled "Component A", and another polypropylene component, labeled "Component B", were blended in a particular ratio to yield a polymer resin that was then spunbonded to form spunbond nonwoven fabrics. Table 1 below summarizes the characteristics of the individual Components A and B as well as the physical properties and measured characteristics of the polymer resins. The maximum spinning speed and fiber properties (elongation and tenacity) of each polymer resin are also shown.

The blends of Examples 1-8, 10-13, and 15-18 were prepared by a melt blend process, and the blends of Examples 9 and 14 were prepared by a dry blend process. In the melt blend process, the polymer Components A and B were added to a rotating double cone blender in the stated ratios and mixed to form a physical blend. This physical blend was fed to a twin screw extruder or single screw extruder where the blend was melted and homogenized. The homogenized molten polymer was then pelletized using an underwater pelletizer. The pelletized material (melt blend) was then fed to the fiber spinning extruder. In the dry blend process, the polymer Components A and B were tumble blended to form a uniformed pellet blend without melting the pellet blend. The pellet blend was then fed directly into the fiber spinning extruder. Alternatively, the Components A and B were fed individually in the stated ratio to a hopper of the fiber spinning extruder. The agitator in the hopper of the extruder blended the Components A and B such that the homogenation of the two components was done in the fiber spinning extruder before fiber spinning.

The fiber spinning machine is commercially available from Hills, Inc., located in West Melbourne, Florida. The fiber spinning machine is of lab scale size with a 2 inch single screw extruder. The spinnerette has 72 capillaries. Each capillary diameter was 0.6 mm and the spin speed was greater than 1,500 m/min. The fibers were collected on a spool and the tenacity and elongation of the fibers were measured following standard tests. Specifically, the fiber elongation and tenacity were measured using a Textechno Statimat M loaded with a Textechno program FPAM0210E. These Tetechno products are commercially available from Textechno Herbert Stein GmbH & Co. located in Monchengladbach, Germany.

To test the fiber, the fiber bundle was threaded through ceramic guides on the Statimat M into a pneumatic clamp. The fiber bundle was pulled at 1270 mm/min until it failed. The force to pull the fiber bundle and the strain of the fiber bundle were recorded until the failure occurred. Failure was either a catastrophic break or a reduction of 90% from the peak force registered during the test. A minimum of five pulls were made to complete the test. The collected data included the peak force, ultimate elongation and tenacity, which is found by dividing the peak force by the fiber denier or weight. This data is summarized below in Table 1.

TABLE 1

| | EXAMPLE: | | | | | | |
|---|---|---|---|---|---|---|---|
| | 1 | 2 | 3 | 4 | 5 | 6 | 7 |
| Component A: | | | | | | | |
| MFR | 2 | 4.5 | 4.5 | 20 | 20 | 20 | 36 |
| % of blend | 57 | 54 | 65 | 82 | 57.5 | 57.5 | 70 |
| Mn | 94204 | 65565 | 65565 | 60454 | 60454 | 60454 | 63500 |
| Mw | 341177 | 276313 | 276313 | 180432 | 180432 | 180432 | 162587 |
| Mz | 883062 | 739943 | 739943 | 353776 | 353776 | 353776 | 308948 |
| Mz + 1 | 1643761 | 1444303 | 1444303 | 578500 | 578500 | 578500 | 516366 |
| Mw/Mn | 3.62 | 4.21 | 4.21 | 2.98 | 2.98 | 2.98 | 2.56 |
| Component B: | | | | | | | |
| MFR | 400 | 400 | 1500 | 400 | 400 | 400 | 400 |
| % of blend | 43 | 46 | 35 | 18 | 42.5 | 42.5 | 30 |
| Mn | 26501 | 26501 | 15793 | 26501 | 26501 | 26501 | 26501 |
| Mw | 92194 | 92194 | 59802 | 92194 | 92194 | 92194 | 92194 |
| Mz | 228548 | 228548 | 107736 | 228548 | 228548 | 228548 | 228548 |
| Mz + 1 | 488664 | 488664 | 152341 | 488664 | 488664 | 488664 | 488664 |
| Mw/Mn | 3.48 | 3.48 | 3.79 | 3.48 | 3.48 | 3.48 | 3.48 |
| BLEND: | | | | | | | |
| MFR | 23.9 | 26.9 | 19.3 | 35 | 75 | 70.8 | 71.7 |
| Mn | 36428 | 34313 | 34031 | 43557 | 35038 | 34557 | 43499 |
| Mw | 205936 | 196764 | 196868 | 161807 | 137952 | 128311 | 133892 |
| Mz | 701912 | 596433 | 601546 | 349249 | 316175 | 283597 | 273244 |
| Mz + 1 | 1427636 | 1088436 | 1182479 | 613158 | 565928 | 491703 | 477403 |
| Mw/Mn | 5.65 | 5.73 | 5.78 | 3.71 | 3.94 | 3.71 | 3.08 |
| FIBER: | | | | | | | |
| Spinning speed at break, m/min | 4560 | 4610 | 4670 | 5000* | 5000* | 5000* | 4970 |
| Tenacity (g/den) | | | | | | | |
| Fiber produced at 1500 m/m | 1.41 | 1.49 | 1.41 | 1.97 | 1.68 | 1.76 | 1.92 |

TABLE 1-continued

|  | | | | | | | |
|---|---|---|---|---|---|---|---|
| Fiber produced at 2500 m/m | 1.76 | 1.91 | 1.81 | 2.21 | 1.86 | 2.05 | 2.37 |
| Elongation (%) | | | | | | | |
| Fiber produced at 1500 m/m | 377 | 368 | 338 | 238 | 263 | 283 | 230 |
| Fiber produced at 2500 m/m | 308 | 289 | 274 | 196 | 206 | 221 | 188 |

|  | EXAMPLE: | | | | | | |
|---|---|---|---|---|---|---|---|
|  | 8 | 9 | 10 | 11 | 12 | 13 | 14 |
| Component A: | | | | | | | |
| MFR | 36 | 36 | 36 | 36 | 36 | 36 | 36 |
| % of blend | 74 | 74 | 86 | 70.2 | 58.9 | 74.2 | 74.2 |
| Mn | 63500 | 63500 | 63500 | 63500 | 63500 | 63500 | 63500 |
| Mw | 162587 | 162587 | 162587 | 162587 | 162587 | 162587 | 162587 |
| Mz | 308948 | 308948 | 308948 | 308948 | 308948 | 308948 | 308948 |
| Mz + 1 | 516366 | 516366 | 516366 | 516366 | 516366 | 516366 | 516366 |
| Mw/Mn | 2.56 | 2.56 | 2.56 | 2.56 | 2.56 | 2.56 | 2.56 |
| Component B: | | | | | | | |
| MFR | 4.2 | 4.2 | 400 | 400 | 400 | 4.2 | 2 |
| % of blend | 26 | 26 | 14 | 29.8 | 41.1 | 25.8 | 25.8 |
| Mn | 65311 | 65311 | 26501 | 26501 | 26501 | 60454 | 94204 |
| Mw | 287697 | 287697 | 92194 | 92194 | 92194 | 180432 | 341177 |
| Mz | 790260 | 790260 | 228548 | 228548 | 228548 | 353776 | 883062 |
| Mz + 1 | 1601008 | 1601008 | 488664 | 488664 | 488664 | 578500 | 1643761 |
| Mw/Mn | 4.41 | 4.41 | 3.48 | 3.48 | 3.48 | 2.98 | 3.62 |
| BLEND: | | | | | | | |
| MFR | 22.6 | — | 50 | 75 | 100 | 20 | — |
| Mn | 62852 | — | 55695 | 42482 | 41230 | 57860 | — |
| Mw | 173978 | — | 143081 | 134100 | 128665 | 185961 | — |
| Mz | 380393 | — | 271468 | 277106 | 288582 | 475511 | — |
| Mz + 1 | 722914 | — | 439372 | 466623 | 530974 | 1049026 | — |
| Mw/Mn | 2.77 | — | 2.57 | 3.16 | 3.12 | 3.21 | — |
| FIBER: | | | | | | | |
| Spinning speed at break, m/min | 5000* | 4930 | 5000* | 4960 | 5000* | 5000* | 5000* |
| Tenacity (g/den) | | | | | | | |
| Fiber produced at 1500 m/m | 1.89 | 2.04 | 2.22 | 1.92 | 1.57 | 1.91 | 1.99 |
| Fiber produced at 2500 m/m | 2.27 | 2.23 | 1.47 | 2.17 | 1.96 | 2.15 | 2.21 |
| Elongation (%) | | | | | | | |
| Fiber produced at 1500 m/m | 318 | 291 | 234 | 238 | 236 | 286 | 364 |
| Fiber produced at 2500 m/m | 259 | 231 | 173 | 184 | 192 | 249 | 292 |

|  | EXAMPLE: | | | | Comparative Example 1 | Comparative Example 2 |
|---|---|---|---|---|---|---|
|  | 15 | 16 | 17 | 18 | | |
| Component A: | | | | | | |
| MFR | 36 | 400 | 400 | 400 | 36 | 24 |
| % of blend | 74.2 | 57 | 63 | 54 | 100 | 100 |
| Mn | 63500 | 26501 | 26501 | 26501 | 63500 | 92338 |
| Mw | 162587 | 92194 | 92194 | 92194 | 162587 | 161508 |
| Mz | 308948 | 228548 | 228548 | 228548 | 308948 | 246026 |
| Mz + 1 | 516366 | 488664 | 488664 | 488664 | 516366 | 332317 |
| Mw/Mn | 2.56 | 3.48 | 3.48 | 3.48 | 2.56 | 1.81 |
| Component B: | | | | | | |
| MFR | 2 | 2 | 4.5 | 2 | — | — |
| % of blend | 25.8 | 43 | 37 | 46 | — | — |

TABLE 1-continued

|  |  |  |  |  |  |  |
|---|---|---|---|---|---|---|
| Mn | 94204 | 94204 | 65565 | 94204 | — | — |
| Mw | 341177 | 341177 | 276313 | 341177 | — | — |
| Mz | 883062 | 883062 | 739943 | 883062 | — | — |
| Mz + 1 | 1643761 | 1643761 | 1444303 | 1643761 | — | — |
| Mw/Mn | 3.62 | 3.62 | 4.21 | 3.62 | — | — |
| BLEND: |  |  |  |  |  |  |
| MFR | 18 | 27 | 67.0 | 23.3 | 35.8 | 23.8 |
| Mn | 56659 | 37137 | 28879 | 37300 | 60260 | 82179 |
| Mw | 146213 | 178002 | 158839 | 203516 | 149235 | 154168 |
| Mz | 272407 | 491751 | 578741 | 731662 | 271613 | 231229 |
| Mz + 1 | 446536 | 870401 | 1294369 | 1566395 | 432921 | 320756 |
| Mw/Mn | 2.58 | 4.79 | 5.50 | 5.46 | 2.48 | 1.88 |
| FIBER: |  |  |  |  |  |  |
| Spinning speed at break, m/min | 4360 | 4500 | 4390 | 4455 | 5000* | 4970 |
| Tenacity (g/den) |  |  |  |  |  |  |
| Fiber produced at 1500 m/m | 1.98 | 1.51 | 1.37 | 1.51 | 2.48 | 3.10 |
| Fiber produced at 2500 m/m | 2.28 | 1.80 | 1.48 | 1.75 | 2.75 | 4.05 |
| Elongation (%) |  |  |  |  |  |  |
| Fiber produced at 1500 m/m | 347 | 375 | 405 | 356 | 197 | 169 |
| Fiber produced at 2500 m/m | 266 | 271 | 274 | 290 | 169 | 115 |

As shown in Table 1 above, it has been surprisingly found that polyolefin fibers having an elongation percentage of 300% or more are capable of spinning at speeds in excess of 4,000 m/min. It is even more surprising that these polyolefin fibers have a tenacity greater than 250 g/den at spinning speeds up to 5,000 m/min.

Table 2 shown below summarizes various spunbond, nonwoven fabric samples made according to embodiments described herein. The key processing conditions employed for each sample are provided, namely throughput rate, fabric basis weight, suction fan RPM, cooling fan RPM, and the temperature setting of the thermal bonding roll. The throughput rate is characterized by grams per spinneret capillary hole per minute. The suction and cooling fan speed (RPM) is used to control the fiber quenching rate and fiber drawing speed. Table 2 also shows the peak load and peak elongation of the fabric samples.

These nonwoven fabric samples were produced on an upgraded one meter Reicofil line, commercially available from Reifenhauser Gmbh & Maschinenfabrik of Troisdorf, Germany and located at The Textiles and Nonwovens Development Center (TANDEC) at the University of Tennessee-Knoxville. The extruder is 70 mm (2.75 in) with a 30:0 length: diameter ratio. There were 4036 die plate holes, each having a diameter of 0.6 mm. Other details of the Reifenhauser system can be found in U. S. Pat. No. 4,820,142.

Fabric testing was performed according to ASTM standard D5035-90, with the following exceptions. A gauge length of 5 inches and a crosshead speed of 5 inches per minute were used. Six-1 inch wide strips were cut in both the machine direction (MD) and the Transverse direction (TD) of the spunbond fabric for testing. Fabric failure was defined as the point at which the tensile force dropped to 90% of the peak load. The maximum load, elongation at maximum load, the elongation to break were measured for both the MD and TD.

Sample A was a melt blend of 74% of a 36 MFR PP homopolymer and 26% of a 4.2 MFR PP homopolymer made according to the melt blend process described above.

Sample B was a melt blend of 70% of a 36 MFR PP homopolymer and 30% of a 400 MFR PP homopolymer made according to the melt blend process described above.

Sample C was a melt blend of 57.5% of a 20 MFR PP homopolymer and 42.5% of a 400 MFR PP homopolymer made according to the melt blend process described above.

Sample D was a dry blend of 74% of a 36 MFR PP homopolymer and 26% of a 4.2 MFR PP homopolymer made according to the melt blend process described above.

Sample E was a melt blend of 43% of a 2 MFR PP homopolymer and 57% of a 400 MFR PP homopolymer made according to the melt blend process described above.

Sample F was a melt blend of 75% of a 36 MFR PP homopolymer and 25% of a 2 MFR PP homopolymer made according to the melt blend process described above.

The comparative sample was a PP3155 polypropylene homopolymer, which is commercially available from ExxonMobil Chemical Company of Houston, Tex. The PP3155 has a MFR of about 36 g/10 min.

TABLE 2

Spunbond Fabric Preparation and Comparison.

| Resin Sample | Processing Conditions | | | | Bonding Roll Surface Temp. | | Fabric Properties | |
|---|---|---|---|---|---|---|---|---|
| | Throughput (ghm) | Basis Weight (g/m²) | Suction Fan RPM | Cooling Fan RPM | Upper roll ° F. | Lower roll ° F. | CD Peak Load lbs | CD Peak Elongation % |
| Comparative Sample | 0.25 | 15 | 1564 | 1873 | 272 | 268 | 2.29 | 60 |
| Sample A | 0.25 | 15 | 1570 | 1870 | 273 | 268 | 2.57 | 95 |
| Sample B | 0.25 | 15 | 1568 | 1870 | 272 | 268 | 1.87 | 53 |
| Sample C | 0.25 | 15 | — | — | 271 | 268 | 1.82 | 60 |
| | 0.25 | 68 | 2241 | 2471 | 271 | 268 | 10.65 | 84 |
| Sample D | 0.25 | 15 | 1584 | 1889 | 272 | 268 | 2.69 | 113 |
| Sample E | 0.25 | 15 | 1390 | 1677 | 272 | 268 | 2.10 | 72 |
| Sample F | 0.25 | 15 | 1366 | 1668 | 271 | 267 | 2.51 | 104 |

The ASTM test procedures referred to herein are made in reference to the current 2003 procedures, unless otherwise noted. Furthermore, recited parameter ranges have been used herein. These ranges include the recited end point values as well as those values defined by or between the recited end points. A given range is intended to encompass values outside of the recited range that are within that particular measurement method's error margin. The recited ranges should also extend to values that are not statistically different from those recited. Further, the ranges should be extended past the recited end points to include all values that are known or found to be functionally equivalent to a value within the recited range or its endpoints.

While the foregoing is directed to embodiments of the present invention, other and further embodiments of the invention may be devised without departing from the basic scope thereof, and the scope thereof is determined by the claims that follow.

What is claimed is:

1. A fiber comprising: A blended polypropylene composition, comprising:
   70% to 90% by weight of a first propylene polymer component having a weight average molecular weight of less than 180,000 and a melt flow rate of from about 30 g/10 min to about 400 g/10 min measured according to ASTM D-1238, condition 230/2.16; and
   30% to 10% by weight of a second propylene polymer component having a weight average molecular weight of more than 180,000 and a melt flow rate of from about 0.1 g/10 min to about 30 g/10 min measured according to ASTM D-1238, condition 230/2.16,
   wherein the blended polypropylene composition has a melt flow rate of greater than 10 g/10 min measured according to ASTM D-1238, condition 230/2.16; and
   wherein the fibers have an Elongation value greater than 200 percent when spun at a speed of 1,500 m/min or more and at an output rate of 0.6 gram/hole/min under normal cooling conditions.

2. The fiber of claim 1, wherein the first polymer component has a melt flow rate of from about 40 g/10 min to about 200 g/10 min measured according to ASTM D-1238, condition 230/2.1.

3. The fiber of claim 1, wherein the second polymer component has a melt flow rate of from about 0.1 g/10 min to about 10 g/10 min measured according to ASTM D-1238, condition 230/2.1.

4. The fiber of claim 1 having a melt flow rate of greater than 25 dg/10 min measured according to ASTM D-1238, condition 230/2.1.

5. The fiber of claim 1 wherein at least one of the two components is a propylene copolymer.

6. The fiber of claim 1 wherein at least one of the two components is a propylene homopolymer.

7. The fiber of claim 1 wherein one or both components are produced using a metallocene catalyst.

8. The fiber of claim 1, having a tenacity of greater than 1 g/denier when spun at a speed of 1,500 m/min and at an output rate of 0.6 gram/hole/min under normal cooling condition.

9. A nonwoven fabric comprising: A blended polypropylene composition, comprising:
   70% to 90% by weight of a first propylene polymer component having a weight average molecular weight of more than 180,000 and a melt flow rate of from about 30 g/10 min to about 400 g/10 min measured according to ASTM D-1238, condition 230/2.16; and
   30% to 10% by weight of a second propylene polymer component having a weight average molecular weight of more than 180,000 and a melt flow rate of from about 0.1 g/10 min to about 30 g/10 min measured according to ASTM D-1238, condition 230/2.16,
   wherein the blended polypropylene composition has a melt flow rate of greater than 10 g/10 min measured according to ASTM D-1238, condition 230/2.16; and
   wherein the nonwoven fabric is made from fibers produced from the composition, the fibers having an Elongation value greater than 200 percent when spun at a speed of 1,500 m/min or more and at an output rate of 0.6 gram/hole/min under normal cooling conditions.

10. The nonwoven fabric of claim 9, wherein the first polymer component has a melt flow rate of from about 40 g/10 min to about 200 g/10 min measured according to ASTM D-1238, condition 230/2.1.

11. The nonwoven fabric of claim 9, wherein the second polymer component has a melt flow rate of from about 0.1 g/10 min to about 10 g/10 min measured according to ASTM D-1238, condition 230/2.1.

12. The nonwoven fabric of claim 9 having a melt flow rate of greater than 25 dg/10 min measured according to ASTM D-1238, condition 230/2.1.

13. The nonwoven fabric of claim 9 wherein at least one of the two components is a propylene copolymer.

14. The nonwoven fabric of claim 9 wherein at least one of the two components is a propylene homopolymer.

15. The nonwoven fabric of claim 9 wherein one or both components are produced using a metallocene catalyst.

16. The fiber or nonwoven fabric of claims 1 or 9, respectively, wherein the fiber has an Elongation value of 300 percent or more at spinning speeds of 3000 m/min or more.

* * * * *